United States Patent
Sumide

(10) Patent No.: US 6,873,781 B2
(45) Date of Patent: Mar. 29, 2005

(54) OPTICAL FIBER WIRING BOARD

(75) Inventor: Makoto Sumide, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 212 days.

(21) Appl. No.: 10/386,819

(22) Filed: Mar. 11, 2003

(65) Prior Publication Data

US 2004/0179805 A1 Sep. 16, 2004

(51) Int. Cl.$^7$ .............................................. G02B 6/00
(52) U.S. Cl. ..................................................... 385/137
(58) Field of Search ........................... 385/137, 14, 114

(56) References Cited

U.S. PATENT DOCUMENTS

| | | | |
|---|---|---|---|
| 4,496,215 A | * 1/1985 | Shaheen et al. | 385/114 |
| 5,204,925 A | 4/1993 | Bonanni et al. | |
| 5,259,051 A | 11/1993 | Burack et al. | |
| 5,292,390 A | 3/1994 | Burack et al. | |
| 5,394,504 A | 2/1995 | Burack et al. | |
| 5,582,673 A | 12/1996 | Burack et al. | |
| 6,106,941 A | * 8/2000 | Fisher et al. | 428/355 EN |
| 6,181,863 B1 | * 1/2001 | Engberg et al. | 385/136 |

FOREIGN PATENT DOCUMENTS

| | | | | |
|---|---|---|---|---|
| JP | 7-248420 | | 9/1995 | |
| JP | 8-240732 | | 9/1996 | |
| JP | 11-2358447 | | 9/1999 | |
| JP | 2000-19356 | | 1/2000 | |
| JP | 2000-121879 | | 4/2000 | |
| JP | 2000-147266 | | 5/2000 | |
| JP | 2000-206341 | | 7/2000 | |
| JP | 2000-231046 | | 8/2000 | |
| JP | 2000-329948 | | 11/2000 | |
| JP | 2003-90922 A | * | 3/2003 | 385/14 |
| JP | 2003-240974 A | * | 8/2003 | 385/14 |
| JP | 2003-240975 A | * | 8/2003 | 385/14 |
| WO | WO96/38751 | | 12/1996 | |
| WO | WO 98/29771 | | 7/1998 | |

* cited by examiner

Primary Examiner—Akm Enayet Ullah
Assistant Examiner—Mike Stahl
(74) Attorney, Agent, or Firm—Melanie G. Gover

(57) ABSTRACT

An optical fiber wiring board is formed including a first flexible adhesive layer and a second flexible adhesive layer, each of the flexible adhesive layers having a contact surface and an opposing surface. Optical fibers are laid in a predetermined pattern on a contact surface of the first adhesive layer, and then pressed into the contact surface of the second adhesive layer which has been coated with a primer whereby both contact surfaces adhere to each other and said optical fibers become embedded in both the first and the second flexible adhesive layers to at least a radius depth of the optical fibers, the contact surfaces of the first and the second adhesive layers being chemically bonded to each other at ambient temperature by means of the primer.

7 Claims, 2 Drawing Sheets

OPTICAL FIBER WIRING BOARD

TECHNICAL FIELD

The present invention relates to an optical fiber wiring board.

BACKGROUND ART

Optical fibers are used as a signal transmitting means for transmitting signals inside communication devices or computers and to connect such devices to other devices or power sources. Because these optical fibers are very thin, the optical transmitting efficiency of the optical fibers deteriorates when they are sharply bent. For this reason, it is necessary to conduct wiring using optical fiber wiring boards on which the optical fibers are interposed between soft resin members.

Japanese Examined Patent Publication Nos. 2574611, 2735464 and 2807403 and Japanese Unexamined Patent Publication Nos. 7-248420 and 8-240732 disclose a technique in which optical fibers are laid on an adhesive layer which is provided on a film made of Kapton™ or Mylar™ so as to form a wiring pattern and then coating is conducted on it by the same material. However, since films having minimal flexibility cover both faces of the wiring board, the flexibility of the optical fiber wiring board is substantially impaired, and the working properties are deteriorated. Further, heat and pressure requirements during the coating process render it difficult to mass-produce the above optical fibers.

Japanese Unexamined Patent Publication Nos. 11-258447, 2000-19356, 2000-147266, 2000-206341 and 2000-231046 disclose an optical fiber wiring board having optical fibers laid on an adhesive layer so as to form a wiring pattern, Subsequently, the periphery of the wiring pattern is surrounded by a weir-shaped object and a protective resin layer is formed in the portion surrounded by the weir-shaped object by means of melting or coating. This type optical fiber wiring board is excellent in flexibility because only one film is used. However, it is complicated to form the weir-shaped object and the protective resin layer. For the above reasons, it is difficult to mass-produce this type optical fiber wiring board as well.

Japanese Unexamined Patent Publication No. 11-506546 discloses an optical fiber ribbon cable in which the optical fibers are interposed between adhesive tapes. This patent publication relates to an optical fiber ribbon cable that is used in a linear form so that the optical fibers can be easily connected and its' manufacturing method. This patent publication does not relate to a structure of optical fibers that can be easily bent.

FIG. 5 is a schematic illustration for explaining problems that occur in the prior art described above. FIG. 5(A) illustrates a state in which the optical fiber wiring board must be bent as shown by the broken line, however, the optical fiber board is bent as shown by the solid line and the optical fibers are sharply bent and thus wrinkles are created. FIG. 5(B) illustrates a state in which the optical fibers are not completely covered with resin. In this situation, the optical fibers are not stabilized. Accordingly, there is a possibility that the transmitting characteristic of the optical fibers will becomes unstable.

The present invention has been developed to solve the above problems. It is an object of the present invention to provide an optical fiber wiring board characterized in that the optical fiber wiring board can be easily manufactured and bent and further the optical fibers can be stably held on the optical fiber wiring board.

DISCLOSURE OF THE INVENTION

An optical fiber wiring board is provided wherein optical fibers are laid in a predetermined pattern on a contact surface of a first flexible adhesive layer, a contact surface of a second flexible adhesive layer is coated with a primer, and then pressed onto the first adhesive layer so as to make the adhesive contact surfaces adhere to each other, and embed the optical fibers in both the first and the second flexible adhesive layers at least to a depth corresponding to the radius of the optical fibers. The surfaces of the first and the second adhesive layers are chemically bonded to each other by means of the primer at ambient temperatures.

On this optical fiber wiring board, the first and the second adhesive layer are very soft so that the optical fibers can be positively covered with both adhesive layers. Since the first and the second adhesive layer are chemically bonded to each other, the optical fibers can be stably held on the optical fiber wiring board. Further, since the first and the second adhesive layer are made to adhere to each other when they are pressed at ambient temperatures, the optical fiber wiring board can be easily manufactured.

Preferably, the elastic modulus of the first and the second adhesive layer at ambient temperature is less than or equal to $1 \times 10^6$ Pa.

In one preferred embodiment, the first and the second adhesive layer are made of the same material.

In one embodiment, thickness of each of the first and the second adhesive layers is at least twice the radius of the optical fiber.

Preferred compositions for the first and the second adhesive layer include acrylic adhesives, and the primer is an isocyanate.

In another embodiment, the first adhesive layer is pressed to the second adhesive layer by roller lamination. Therefore, the first and the second adhesive layer can be made to adhere by a simple process.

In one preferred embodiment, a coating to prevent the adhesive layer from being sticky is provided on the opposing surface of the first adhesive layer and may also be present on the opposing surface of the second adhesive layer. A non-tacky coating may also be placed on the contact surface of one of the adhesive layers, rendering it possible to effectively arrange the optical fibers prior to adhering the two adhesive layers together. This coating material may contain one or both of polyolefin and isocyanate.

A flexible film may be bonded onto one of or both of the opposing surfaces of the first adhesive layer and that of the second adhesive layer. Therefore, the bending strength of the optical fiber wiring board can be enhanced, and the outer surfaces can be rendered nontacky. Therefore, the optical fibers can be effectively arranged for use/.

DETAILED DESCRIPTION OF THE DRAWINGS

Referring to the accompanying drawings, one embodiment of the present invention will be explained as follows.

In this connection, some portions of the embodiment are enlarged for the sake of convenience.

Figure 1:
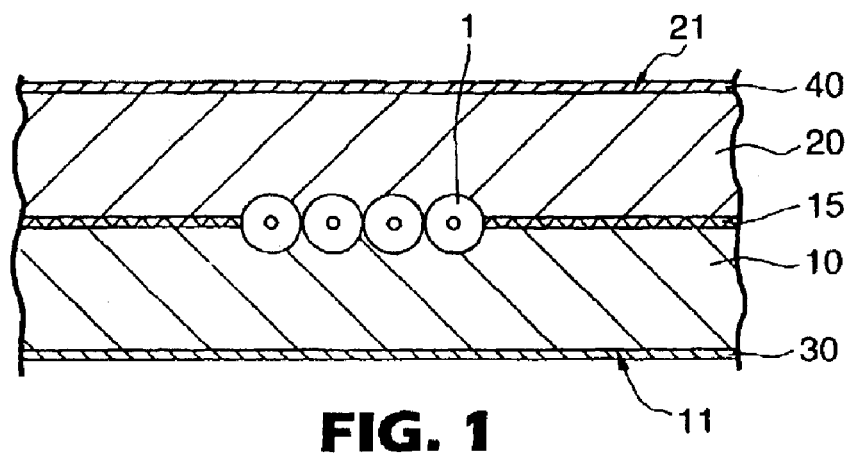
FIG. 1 is a schematic illustration of a first embodiment.

FIG. 1 is a sectional view showing a first embodiment of the optical fiber wiring board of the present invention. Referring to FIG. 1, lower half portions of the optical fibers 1 are embedded in the first adhesive layer 10; that is, the optical fibers 1 are closely coming into contact with an upper face of the first adhesive layer 10, and upper half portions of the optical fibers 1 are embedded in the second adhesive layer 20. The primer layer 15 is provided between the first adhesive layer 10 and the second adhesive layer 20. The first coating layer 30 is provided on the opposing face of the first adhesive layer 10, and the second coating layer 40 is provided on an opposing face of the second adhesive layer 20.

Each optical fiber 1 is composed of a core portion and clad portion and covered with industrial resin. In this first embodiment, GGP™ fibers manufactured by 3M Corporation are used, and the outer diameter of each optical fiber 1 is 0.25 mm. These optical fibers 1 are laid on the first adhesive layer 10 according to a predetermined pattern.

As noted, it is required that the first adhesive layer 10 has a high flexibility so that the optical fibers 1 are closely contacted with and embedded in the first adhesive layer 10 when the first adhesive layer 10 is contacted with the second adhesive layer 20 using pressure. Specifically, it is preferable that the elastic modulus of the first adhesive layer 10 is $1 \times 10^6$ Pa at ambient temperature.

As a material having a high flexibility, the first embodiment uses a bond sheet for structure made of VHB acrylic foam (flame-resistance grade type) manufactured by Sumitomo 3M Corporation. This material is an acrylic adhesive, and numerals 03 at the end show that the thickness is 0.3 mm. As described above, it is preferable that the thickness of the first adhesive layer 10 be not less than twice as large as the radius of the optical fiber 1 which is 0.125 mm in this case.

Next, the primer 15 is coated on a contact face of the first adhesive layer 10 on which the optical fibers 1 are laid. The primer 15 is an isocyanate material such as polymethylene-polyphenyl-isocyanate, tolylene-diisocyanate or hexamethylene-diisocyanate and the like. In one embodiment, N200™ manufactured by Sumitomo 3M Corporation is used.

Next, the second adhesive layer 20 is placed onto the contact surface of the first adhesive layer 10 on which the primer 15 has been coated. In this embodiment, a bond sheet for structure of VHS acrylic foam (flame-resistance grade type) manufactured by Sumitomo 3M Corporation is used for the second adhesive layer 20 in the same manner as that of the first adhesive layer 10.

Then, the first adhesive layer 10 is pressed against the second adhesive layer 20. Alternatively, the second adhesive layer 20 is pressed against the first adhesive layer 10. This pressing step can be executed in a simple roller laminating process at ambient temperature.

As a result, as shown in FIG. 1, the optical fibers 1 are respectively embedded in the first adhesive layer 10 and second adhesive layer 20 by the depth corresponding to the radius of each optical fiber. In a portion where the optical fibers 1 are not provided, urethane bonding is chemically conducted between the first adhesive layer 10 and the second adhesive layer 20 by the primer 15 of isocyanate. In this way, the first adhesive layer 10 and the second adhesive layer 20 are strongly bonded to each other. The chemical bond insures that the first adhesive layer 10 and the second adhesive layer 20 cannot be peeled off each other.

When the above bonding step is conducted, if the opposing face 11 of the first adhesive layer 10 and the opposing face 21 of the second adhesive layer 20 are left exposed, these exposed faces are highly tack, and so the working properties will deteriorate. In order to solve the problem, in this first embodiment, the first coating layer 30 is provided on the opposing face of the first adhesive layer 10, and the second coating layer 40 is provided on the opposing face of the second adhesive layer 20.

In this first embodiment, the first adhesive layer 10 and the second adhesive layer 20 are formed from of the same material.

The first coating layer 30 and the second coating layer 40 are formed when liquid containing one of the following materials or a plurality of the following materials is coated or sprayed and dried. Films of chlorinated rubber or other materials may be formed on the surfaces of the adhesive layers. Therefore, the opposing faces of the adhesive layers can be prevented from being tacky. Useful materials include:

(a) Polyolefins, polyalkyl oxides, polyalkyl glycols and polysiloxanes;

(b) polyolefins, polalkyl oxides, polyalkyl glycol and polysiloxanes having a functional group such as a carboxylic acid group, amine group, hydroxyl group or halogen group;

(c) The same materials containing ester bonding, urethane bonding, amide bonding and urea bonding; or (d) Cross linking agent having an isocyanate group, epoxy (oxirane) group, oxetane group or imine group, or silane coupling agent.

In this embodiment, N200 manufactured by Sumitomo 3M Corporation, which is also used as primer, is used. In order to prevent the adhesive layer from being tacky, an inorganic particulate material such as alumina, silica or zeolite (aluminosilicate) or an organic particulate such as polyester, nylon, PMMA (polymethyl-methacrylate) or urethane may be mixed with the primer material. Further, in order to facilitate a cross linking reaction, a catalyst may be also be added into the mixture.

The optical fiber wiring board of the first embodiment is manufactured in the manner described above, and the optical fibers can be covered with the adhesive layers without formation of an air layer. Although the optical fiber wiring board of the first embodiment is provided with a first coating layer 30 and a second coating layer 40, no wrinkles are created even when it is bent to have a radius of curvature not more than 10 mm.

In many such wiring boards, the size of the optical fiber wiring board will be 10 cm×10 cm to 60 cm×150 cm. The most frequently used size is A4 (about 21 cm×29 cm). Typically, the thickness of the optical fiber wiring board is 0.2 mm to 2.0 mm. The most frequently used thickness is approximately 0.7 mm.

Figure 2:
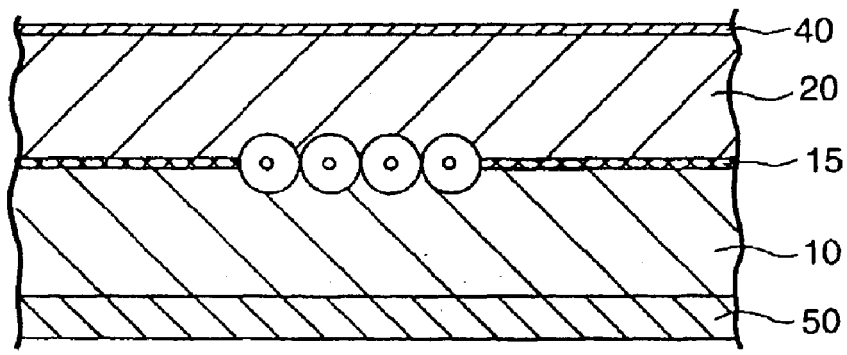
FIG. 2 is a schematic illustration of a second embodiment.

FIG. 2 is a schematic illustration of a second embodiment. In this second embodiment, no coating layer as in the previous embodiment but rather a flexible film 50 is adhered to the opposing face 11 of the first flexible adhesive layer 10. The flexible film 50 can be formed from polyimide, PET and the like. In this embodiment as shown, a polyimide film having a thickness of about 0.125 mm and a tensile elastic coefficient of about $3 \times 10^9$ Pa, is used. The flexible film is used in this embodiment to prevent the adhesive layer from being tacky and is provided on only one side of the adhesive layer. Therefore, the necessary flexibility can be maintained.

The flexible film 50 can be peeled off in the case where the optical fiber wiring board is fixed to a base plate, or a necessary portion of the flexible film 50 may be peeled off so that a portion of the opposing surface of the first adhesive layer 10 or the second adhesive layer 20 is exposed, and this exposed portion may be stuck to a base plate or other desired mounting.

Figure 3:
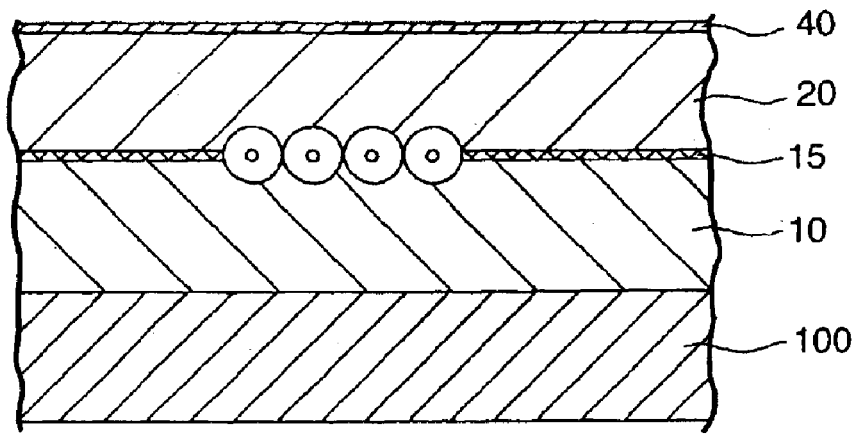
FIG. 3 is a schematic illustration of a third embodiment.

FIG. 3 is a view showing a third embodiment in which the opposing surface of the first adhesive layer 10 is exposed and not covered with a coating or film, but rather adhered to the surface of a base plate 100.

When this embodiment is used, the preferred peeling resistance of the first adhesive layer 10, e.g., the 90° peel force is preferably from 10 to 30 N/cm. It is preferable that the 90° peel force is maintained at a value not lower than 25 N/cm.

Figure 4:
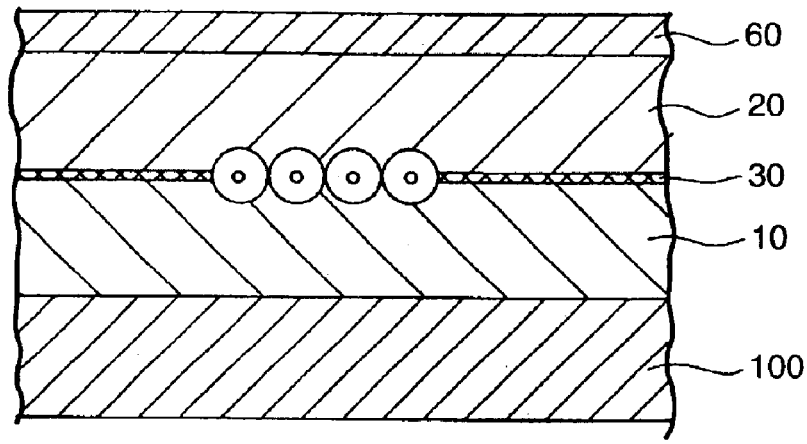
FIG. 4 is a schematic illustration of a fourth embodiment.
Figure 5A:
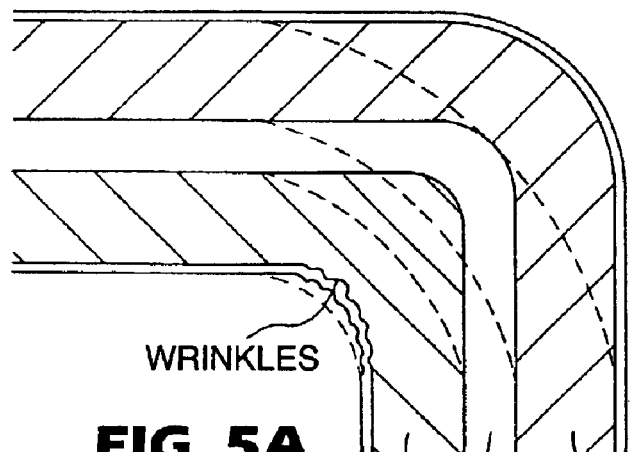
FIGS. 5(A) and 5(b) are schematic illustrations of problems caused by prior art optical fiber wiring boards.
Figure 5B:
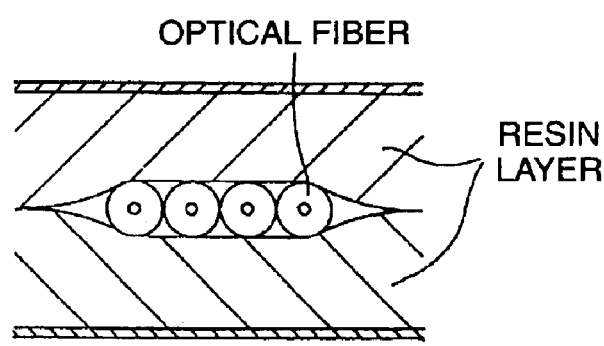

FIG. 4 is a schematic illustration showing a fourth embodiment in which the opposing surface of the first adhesive layer 10 is exposed in the same manner as that shown in FIG. 3 and is adhered to a surface of a base plate 100. In this case, the same flexible film 60 as that shown in FIG. 2 is adhered to the opposing surface of the second adhesive layer 20.

In this embodiment, first, an optical fiber wiring board is made, on which the flexible film 50 is adhered to the opposing surface of the first adhesive layer 10, and the flexible film 60 is adhered to the opposing surface 21 of the second adhesive layer 20. Then, a necessary portion of the flexible film 50, which has been adhered to the opposing surface of the first adhesive layer 10, is peeled off so that the surface of the necessary portion of the first adhesive layer 10 is exposed and adhered to the surface of the base plate 100. A portion of the adhesive layer, which is not stuck to the base plate 100, has the flexible film on both faces. Therefore, the bending strength can be increased, however, the flexibility is decreased in this embodiment.

The present invention provides an optical fiber wiring board, optical fibers being laid by a predetermined pattern on a surface of one of the first and the second adhesive layer, a surface of the other adhesive layer being pressed onto the surface of one of the first and the second adhesive layer so as to make both the surfaces adhere to each other, the first and the second adhesive layer having flexibility so that the optical fibers can be closely contacted with and embedded in the first and the second adhesive layer at least by the depth corresponding to the radius of each optical fiber, the surfaces of the first and the second adhesive layer, which adhere to each other, being pressed to each other via a layer of primer at ambient temperature, and the first and the second adhesive layer being chemically bonded to each other by the primer at ambient temperature. Accordingly, on this optical fiber wiring board, the optical fibers are tightly covered with the first and the second soft adhesive layer. Further, since the first and the second adhesive layer are chemically bonded to each other, the optical fibers are stably held. Therefore, it becomes possible to stably transmit optical signals. Since the first and the second adhesive layer are made to adhere to each other at ambient temperature when they are pressed, the optical fiber wiring board can be easily manufactured, and the manufacturing cost can be reduced.

As described herein, when one of the first and the second adhesive layers is pressed to the other by means of roller lamination, this attachment step can be executed very easily.

Further, when coating to prevent the opposing surfaces of the adhesive layer(s) from being tacky is provided on one or both the opposing faces of the first and second adhesive layers, it becomes possible to prevent the opposing, or outer surfaces from being tacky, so that the optical fibers can be effectively arranged on devices for use.

Since a flexible film is bonded on one of or both of the opposing surfaces of the adhesive layers in another embodiment, the bending strength can be enhanced, and it becomes possible to render the outer surfaces nontacky by this means, so that the optical fibers can be effectively arranged for use.

DESCRIPTION OF THE REFERENCE NUMERALS

10 . . . first adhesive layer
15 . . . primer
20 . . . second adhesive layer
30 . . . first coating layer
40 . . . second coating layer
50, 60 . . . flexible films
100 . . . base plate

What is claimed is:

1. An optical fiber wiring board comprising a first flexible adhesive layer and a second flexible adhesive layer, each of said flexible adhesive layers having a contact surface and an opposing surface, wherein optical fibers are laid in a predetermined pattern on a contact surface of said first adhesive layer, a primer is coated onto said contact surface of said second flexible adhesive layer and second surface is pressed against the contact surface of said first flexible adhesive layer, whereby said contact surfaces adhere to each other and said optical fibers embed in both the first and the second flexible adhesive layers to at least a radius depth of the optical fibers, the contact surfaces of the first and the second adhesive layers being chemically bonded to each other at ambient temperature by means of the primer.

2. An optical fiber wiring board according to claim 1, wherein the first and the second flexible adhesive layers each have a thickness which is not less than twice the radius of the optical fibers.

3. An optical fiber wiring board according to claim 1, wherein the first and the second flexible adhesive layers are formed from acrylic adhesive, and the primer is an isocyanate.

4. An optical fiber wiring board according to claim 1, wherein the contact surfaces of the first and the second flexible adhesive layers are pressed together by means of roller lamination.

5. An optical fiber wiring board according to claim 1, further comprising a nontacky coating on at least one of the opposing surfaces of the first and second flexible adhesive layers.

6. An optical fiber wiring board according to claim 5, wherein the first and the second flexible adhesive layers are formed from acrylic adhesive, and the nontacky coating is formed of a material selected from the group consisting of polyolefin, isocyanate and mixtures thereof.

7. An optical fiber wiring board according to claim 1, wherein a nontacky flexible film is bonded on at least one of the opposing surfaces of the first adhesive layer and second adhesive layer.

* * * * *

UNITED STATES PATENT AND TRADEMARK OFFICE
CERTIFICATE OF CORRECTION

PATENT NO. : 6,873,781 B2
DATED : March 29, 2005
INVENTOR(S) : Sumide, Makoto

It is certified that error appears in the above-identified patent and that said Letters Patent is hereby corrected as shown below:

Title page,
Item [56], References Cited, FOREIGN PATENT DOCUMENTS,
delete "JP 11-2358447" and insert -- JP 11-258447 -- therefor.

Column 1,
Line 64, delete "becomes" and insert -- become -- therefor.

Column 2,
Line 55, after "use" delete "/".

Signed and Sealed this

Twenty-seventh Day of September, 2005

JON W. DUDAS
*Director of the United States Patent and Trademark Office*